V. BENDIX AND R. BARBOUR.
SLIDING GEAR TRANSMISSION.
APPLICATION FILED JULY 8, 1918.

1,372,667.

Patented Mar. 29, 1921.
3 SHEETS—SHEET 1.

INVENTORS:
Vincent Bendix
and Robert Barbour
BY Charles Turner Brown,
ATTORNEY.

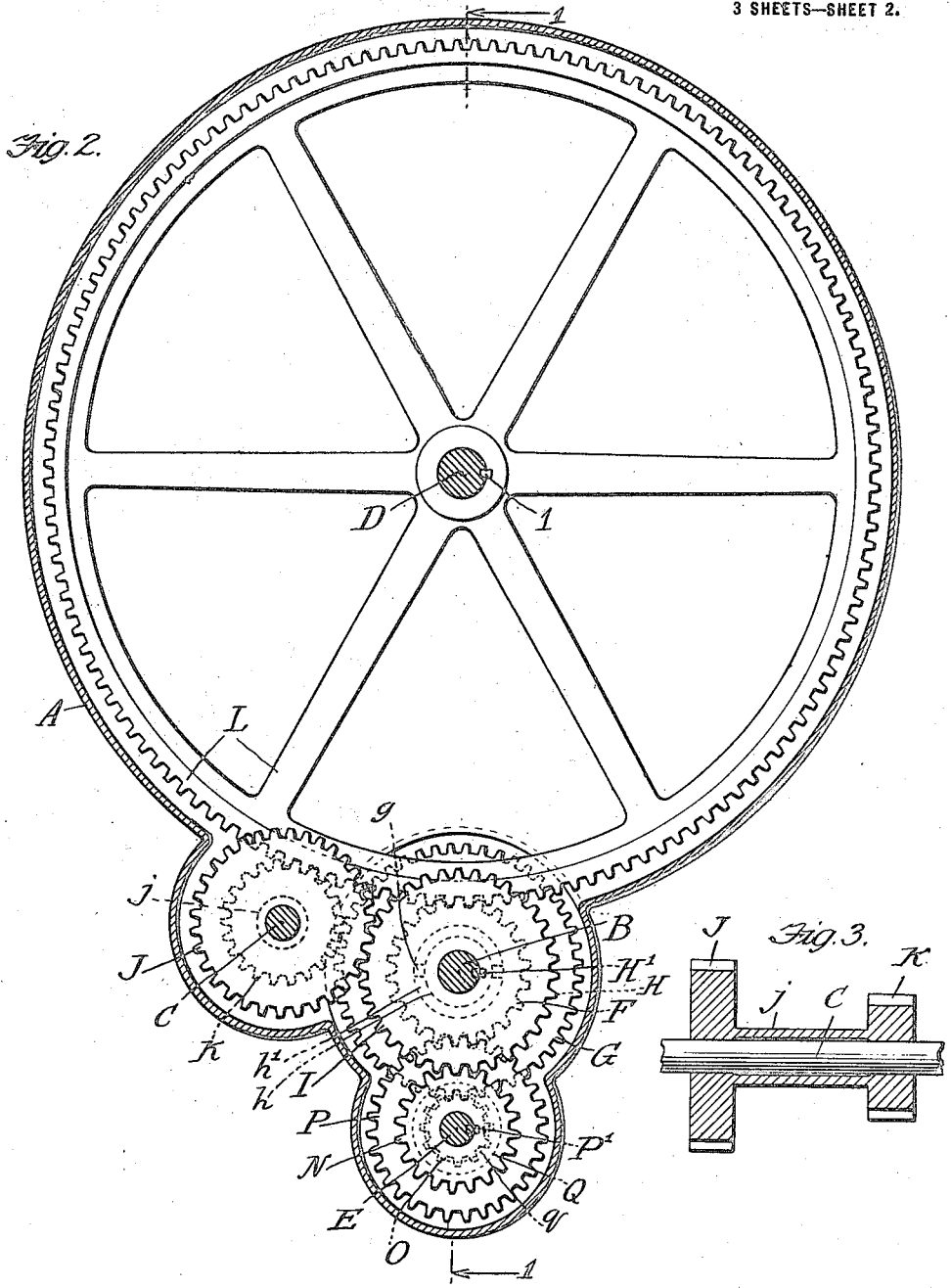

V. BENDIX AND R. BARBOUR.
SLIDING GEAR TRANSMISSION.
APPLICATION FILED JULY 8, 1918.

1,372,667.

Patented Mar. 29, 1921.
3 SHEETS—SHEET 3.

INVENTORS:
Vincent Bendix
and Robert Barbour
BY Charles Turner Brown,
ATTORNEY.

UNITED STATES PATENT OFFICE.

VINCENT BENDIX, OF CHICAGO, ILLINOIS, AND ROBERT BARBOUR, OF PATERSON, NEW JERSEY.

SLIDING-GEAR TRANSMISSION.

1,372,667.          Specification of Letters Patent.          Patented Mar. 29, 1921.

Application filed July 8, 1918. Serial No. 243,763.

*To all whom it may concern:*

Be it known that we, VINCENT BENDIX and ROBERT BARBOUR, citizens of the United States, and residents, respectively, of Chicago, county of Cook, and State of Illinois, and the city of Paterson, county of Passaic, and State of New Jersey, have invented certain new and useful Improvements in Sliding-Gear Transmission, of which the following, when taken in connection with the drawings accompanying and forming a part hereof, is a full and complete specification.

This invention relates to devices which are interposed between a motor and a driven shaft, said shaft being, when the device is applied to a motor driven vehicle, either a jack shaft, or the main driving shaft of the vehicle.

The purpose of the device is to permit the running of the motor at a pre-determined speed while the speed of the vehicle is varied or reversed.

The device illustrated embodies this invention in a construction which is particularly applicable to traction devices and trucks and provides for three forward speeds and a reverse being imparted to the vehicle on which it is installed, the motor being run in the same direction at a substantially constant predetermined speed.

In the drawings referred to,

Fig. 2, is a vertical section of the shell or case on line 2—2 of Fig. 1, illustrating the rotatably mounted members in side elevation, the shafts being shown in cross section.

Fig. 3, is a vertical sectional view of a modified construction of one of the plurality of gear members forming an element of the device.

Figure 1:
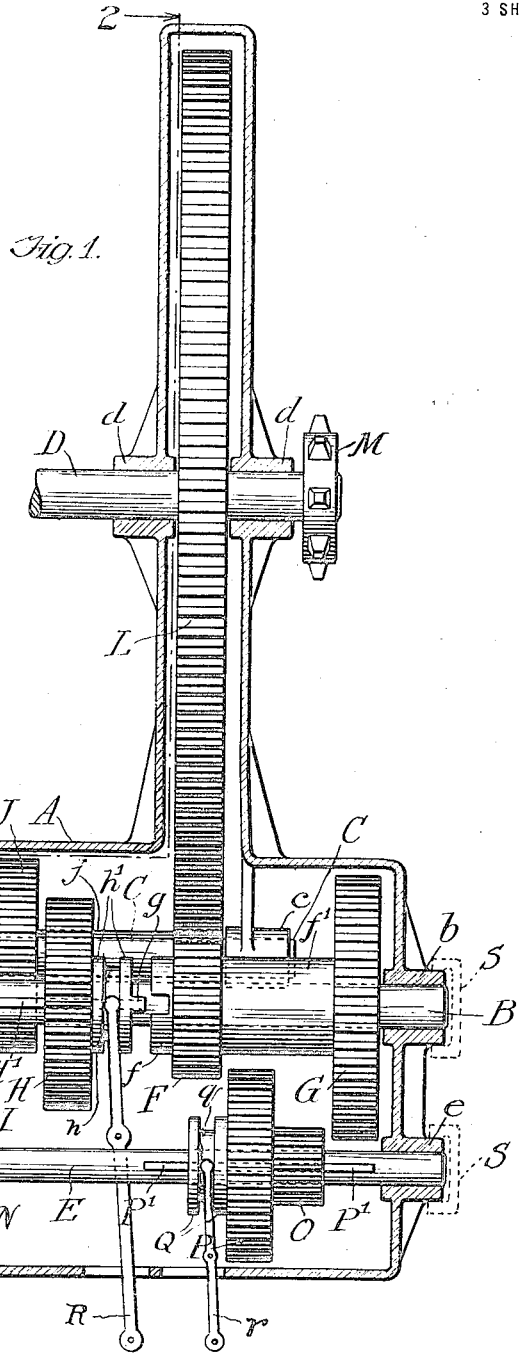
Figure 1, is a vertical section of the shell or case of the device on line 1—1 of Fig. 2, viewed in the direction indicated by the arrows; illustrating the rotatably mounted members of the device in front and edge elevation.

A reference character applied to designate a given part indicates said part throughout the several figures of the drawings, wherever the same appears.

A represents the shell or case of the transmission: B the driving shaft (the clutch shaft of a vehicle when the device is installed thereon): and $b$, $b$, journal bearings of shaft B. C, D and E, respectively represent a shaft, each of which is illustrated in Figs. 1 and 2 as rotatably mounted in journal bearings $c$, $d$, and $e$. Shaft C, in the modification illustrated in Fig. 3, is non-rotatable. F, G, represent a plurality of gear wheels which are joined by sleeve $f'$ to turn synchronously; and said sleeve is mounted, to turn loosely, on shaft B. $f$ represents a clutch member which is joined to wheel F, and is preferably integral therewith or with sleeve $f'$. $g$ represents a clutch member arranged to co-act with member $f$. H represents a gear wheel mounted on shaft B to turn therewith and to be longitudinally movable thereon; and $h$ represents an annular groove in the hub ($h'$) of wheel H. The gear wheel H and hub $h'$ provided with annular groove $h'$ and carrying the clutch member $g$, are longitudinally movable on shaft B and are illustrated as made to turn therewith by means of spline H′ on said shaft with a corresponding lateral groove in said gear wheel and hub. I represents a gear wheel which is rigidly secured on shaft B to turn therewith. J and K represent gear wheels which, in Figs. 1 and 2, are rigidly secured on shaft C, to turn together and in Fig. 3 are joined by sleeve $j$ to turn together, said sleeve being loosely mounted on shaft C. L represents a gear wheel which is mounted on shaft D and is shown in Fig. 2 as keyed thereto by feather $l$. M, represents a sprocket wheel which is mounted on shaft D to turn therewith. When the device is placed in a vehicle a sprocket chain extends from sprocket wheel M to the differential of the vehicle, but said sprocket chain or any means for transmitting the motion of shaft D to the driving shaft or wheels of the vehicle does not form a part of this invention.

Gear wheels F and K are at all times in mesh with gear wheel L. N, represents a gear wheel which is at all times in mesh with gear wheel I. O and P, respectively, represent gear wheels which are mounted on shaft E to turn therewith, as by means of spline P′ and corresponding grooves in said wheels, and are longitudinally movable on said shaft. Q, represents a hub to wheel P which is provided with annular groove $q$. The gear wheels O, P and hub Q at all times rotate synchronously.

R, $r$, are levers by means of which the position of the clutch member $g$, wheel H and hub $h'$ on shaft B and wheels O, P, and hub Q on shaft E are controlled.

The broken lines in Fig. 1 which are designated by the reference characters S indicate caps on the journal bearings $b$, $e$; and when said caps are in place with the modification illustrated in Fig. 3 installed in the device, that portion of the case A in which the shafts B and E are rotatably mounted may contain considerable oil or soft grease without leakage thereof therefrom.

The several wheels and clutches of the device being in the position illustrated in Fig. 1, if shaft B be rotated, shaft E, and wheels O, P are also rotated (gear wheels I, N being in mesh); but said gear shafts and wheels run idle. On reference to Fig. 4, it will be seen that when clutch members $f$ and $g$ are engaged, rotation of shaft B rotates gear wheel F, gear wheel H and gear wheel I on said shaft; and that gear wheel F being in mesh with gear wheel L, said wheel L is rotated thereby. Also, that the rotation of wheel L, it being in mesh with wheel K, rotates said wheel and gear wheel J. Further, the gear wheel N being in mesh with gear wheel I, said gear wheel N, shaft E and gear wheels O, P, will be rotated. The normal position of wheels O and P is illustrated in Fig. 1, with the teeth thereof respectively not meshing with the teeth of wheels F or G.

Figure 4:
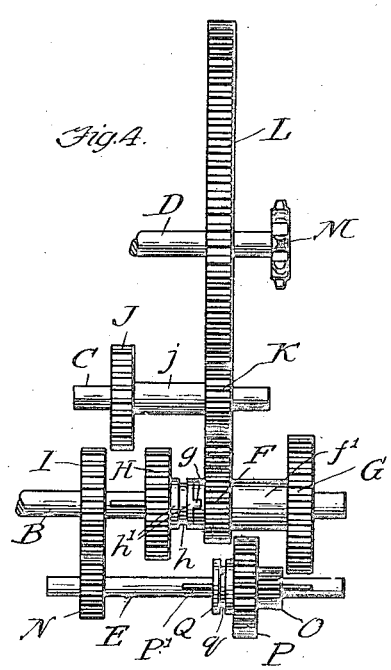

Clutch members $f$, $g$, being engaged, as in Fig. 4, rotation of shaft B, which is the driving shaft of the device, whether said shaft is the clutch shaft or a crank shaft, rotates wheel L, shaft D and sprocket wheel M. The remaining rotatable members which are in motion run idle.

Figure 5:
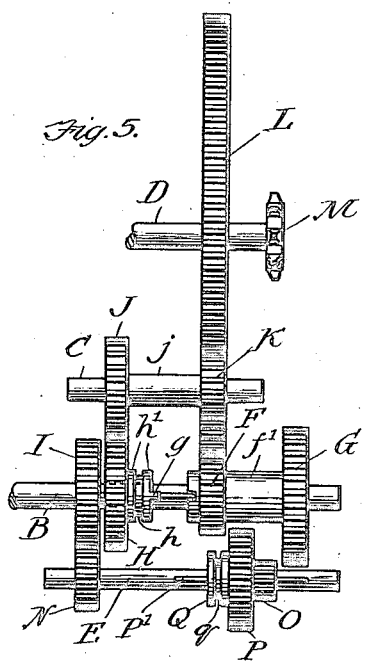
Figs. 4, 5, 6 and 7, are diagrams indicating the different meshes which may be made of the members illustrated in Figs. 1 and 2.

When the several rotatable members are in the position indicated in Fig. 5, clutch members $f$, $g$ being released and gear H being moved longitulinally on shaft B into mesh with gear wheel J, rotation of shaft B will rotate said wheels J and K; and wheel K being in mesh with wheel L, said wheel L shaft D and sprocket M are rotated in a reverse direction.

Figure 6:
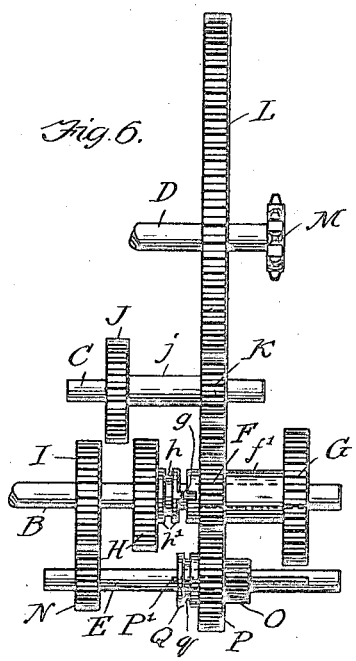

Referring to Fig. 6, the clutch members $f$, $g$ and wheel H being in the position illustrated, and as illustrated in Fig. 1, and wheel P moved longitudinally on shaft E into mesh with wheel F rotation of the shaft B will rotate wheel N, shaft E, wheels P, F and L, turning said wheel L, shaft wheel and sprocket M in the same direction as when members $f$, $g$ are in mesh as above recited but, the speed of shaft B being uniform, at a greater rate of speed.

Figure 7:
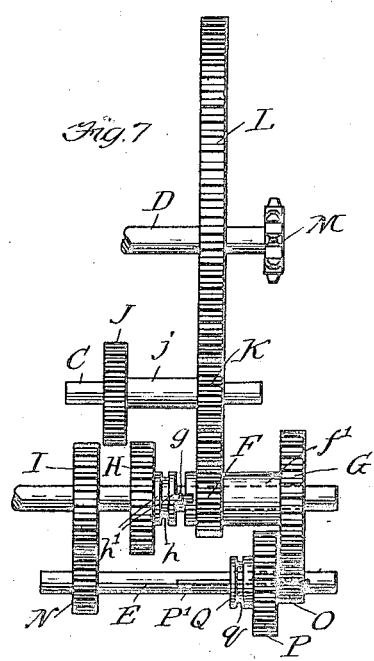

Referring to Fig. 7, clutch members $f$, $g$, not being in engagement, with wheel O moved longitudinally on shaft E to bring said wheel into mesh with wheel G, rotation of shaft B will rotate wheels I, N, (they being at all times in mesh), shaft E, wheels O, G, F and L, but at a lower rate of speed (the speed of shaft B being uniform) as before recited.

We claim:—

1. A rotatably mounted wheel, a driving shaft, first and second auxiliary shafts, means to continuously transmit rotation of said driving shaft to said first auxiliary shaft, means to establish driving connection between said driving shaft and said second auxiliary shaft, and gear connection between said second auxiliary shaft and said wheel, the gear of said last named connection being mounted on said second auxiliary shaft and to be continuously in mesh with said wheel, in combination with gears loosely mounted on said driving shaft, clutch means on said driving shaft, and selective means on said first auxiliary shaft including a slidable connection of gears which are keyed thereto to rotate therewith to successively mesh with said loosely mounted gears on said driving shaft, and means to control the selection of a pre-determined one of said selective means to thereby correspondingly transmit rotation of said driving shaft to said rotatably mounted wheel.

2. In a sliding gear transmission, the combination of a rotatably mounted gear wheel, a plurality of shafts, one a driving and one a driven shaft, and gear wheels on each of said shafts, one of the gear wheels on said driving shaft mounted to turn therewith and to mesh with a gear wheel on said driven shaft, and one to turn loosely on said driving shaft and to be in mesh with said rotatably mounted wheel, and the gear wheels on said driven shaft mounted to turn therewith and one thereof longitudinally movable thereon, with means to successively move said longitudinally movable gear wheel into and out of mesh with said loosely mounted gear wheel.

3. In a sliding gear transmission the combination of a rotatably mounted gear wheel, a driving shaft and a driven shaft, gear wheels on each of said shafts, one of said gear wheels on each of said shafts mounted to turn therewith and to intermesh, and a plurality of additional gear wheels on each of said shafts, each plurality arranged to turn synchronously, said plurality on said driving shaft mounted to turn loosely, with means to join them to the shaft, and one thereof continuously in mesh with said first named gear wheel, and said plurality of gear wheels on said driven shaft mounted to turn therewith and to be longitudinally movable thereon, and means to move said longitudinally movable gear wheels to selectively mesh with said loosely mounted gear wheels on said driving shaft.

4. In a sliding gear transmission, the combination of a rotatably mounted gear wheel, a plurality of shafts, one a driving shaft and the other a driven shaft, and gear wheels on said shafts, a plurality of said gear wheels on each of said shafts arranged to turn synchronously, said plurality on said driving shaft mounted to turn loosely, with means to join them to said shaft, a gear wheel of said plurality on said driving shaft being in mesh with said first named gear wheel, and the plurality of said gear wheels which are mounted to turn with the driven shaft longitudinally movable thereon, and an additional gear wheel on said driven shaft mounted to turn therewith and to mesh with an additional gear wheel mounted on said driving shaft to turn therewith, and means to move said longitudinally movable gear wheels to selectively mesh with a determined one of said loosely mounted plurality of gear wheels on said driving shaft.

5. In a sliding gear transmission the combination of a rotatably mounted gear wheel, a plurality of shafts one thereof a driving shaft, and gear wheels on said shafts, a plurality of said gear wheels on each of said shafts arranged to turn synchronously, and a gear wheel on said driving shaft arranged to turn therewith and longitudinally movable thereon into and out of mesh with one of said plurality on one of said shafts, said plurality on said driving shaft mounted to turn loosely, with means to join them to said shaft, a gear wheel of said plurality on said driving shaft and a gear wheel of an additional one of said pluralities being in mesh with said first named gear wheel, and the remaining plurality of said gear wheels mounted to turn with the shaft thereof and to be longitudinally movable thereon, and one of said gear wheels on said last named shaft mounted to turn therewith and to mesh with an additional one of said gear wheels which is mounted on said driving shaft to turn therewith and means to move said last named movable gear wheels to selectively mesh with a determined one of said loosely mounted plurality of gear wheels on said driving shaft.

VINCENT BENDIX.
ROBERT BARBOUR.

In the presence of—
 CURTIS B. BREECE,
 CLAIRE L. BOMES.